United States Patent
Smith et al.

(10) Patent No.: US 6,962,949 B2
(45) Date of Patent: *Nov. 8, 2005

(54) INK COMPOSITIONS CONTAINING QUATERNARY-SUBSTITUTED LIGHTFASTNESS AGENTS

(75) Inventors: Thomas W. Smith, Penfield, NY (US); Kathleen M. McGrane, Webster, NY (US)

(73) Assignee: Xerox Corporation, Stamford, CT (US)

( * ) Notice: Subject to any disclaimer, the term of this patent is extended or adjusted under 35 U.S.C. 154(b) by 185 days.

This patent is subject to a terminal disclaimer.

(21) Appl. No.: 10/035,736

(22) Filed: Nov. 7, 2001

(65) Prior Publication Data

US 2003/0119939 A1 Jun. 26, 2003

(51) Int. Cl.$^7$ .......................... C08L 11/10; C08L 39/00; C08K 5/3472
(52) U.S. Cl. .......................... 523/160; 524/91; 524/555
(58) Field of Search ................................ 523/160, 161; 524/91, 359, 555

(56) References Cited

U.S. PATENT DOCUMENTS

| | | | |
|---|---|---|---|
| 5,096,781 A | * 3/1992 | Vieira et al. | 428/32.1 |
| 5,990,198 A | 11/1999 | Shwarz, Jr. | 523/160 |
| 6,001,899 A | 12/1999 | Gundlach et al. | 523/160 |
| 6,005,022 A | 12/1999 | Schwarz, Jr. | 523/160 |
| 6,054,505 A | 4/2000 | Gundlach et al. | 523/160 |
| 6,174,355 B1 | 1/2001 | Mayo et al. | 106/31.43 |
| 6,258,873 B1 | 7/2001 | Gundlach et al. | 523/160 |
| 6,274,645 B1 | 8/2001 | Gundlach et al. | 523/160 |
| 6,297,296 B1 | 10/2001 | Wexler | 523/160 |

FOREIGN PATENT DOCUMENTS

| | | | |
|---|---|---|---|
| EP | 693483 A1 | * | 1/1996 |
| JP | 50121178 | * | 9/1975 |
| JP | 10140475 | | 5/1998 |
| JP | 11099740 | | 4/1999 |
| JP | 2000141875 | | 5/2000 |
| WO | WO 97/20000 A2 | * | 6/1997 |

* cited by examiner

Primary Examiner—Callie Shosho
(74) Attorney, Agent, or Firm—Judith L. Byorick

(57) ABSTRACT

Disclosed is an ink composition comprising (a) water, (b) an anionic dye, (c) a polyquaternary amine compound, and (d) a quaternary ammonium substituted UV absorbing compound. Another embodiment of the present invention is directed to an ink composition comprising (a) water, (b) a complex of (i) an anionic dye and (ii) a polyquaternary amine compound, and (c) a quaternary ammonium substituted UV absorbing compound.

26 Claims, No Drawings

INK COMPOSITIONS CONTAINING QUATERNARY-SUBSTITUTED LIGHTFASTNESS AGENTS

BACKGROUND OF THE INVENTION

The present invention is directed to aqueous ink compositions. More specifically, the present invention is directed to ink compositions exhibiting improved lightfastness. One embodiment of the present invention is directed to an ink composition comprising (a) water, (b) an anionic dye, (c) a polyquaternary amine compound, and (d) a quaternary ammonium substituted UV absorbing compound.

Another embodiment of the present invention is directed to an ink composition comprising (a) water, (b) a complex of (i) an anionic dye and (ii) a polyquaternary amine compound, and (c) a quaternary ammonium substituted UV absorbing compound.

Ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field which adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

Since drop-on-demand systems require no ink recovery, charging, or deflection, the system is much simpler than the continuous stream type. There are two types of drop-on-demand ink jet systems. One type of drop-on-demand system has as its major components an ink filled channel or passageway having a nozzle on one end and a piezoelectric transducer near the other end to produce pressure pulses. The relatively large size of the transducer prevents close spacing of the nozzles, and physical limitations of the transducer result in low ink drop velocity. Low drop velocity seriously diminishes tolerances for drop velocity variation and directionality, thus impacting the system's ability to produce high quality copies. Drop-on-demand systems which use piezoelectric devices to expel the droplets also suffer the disadvantage of a slow printing speed.

Another type of drop-on-demand system is known as thermal ink jet, or bubble jet, and produces high velocity droplets and allows very close spacing of nozzles. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink in the immediate vicinity to evaporate almost instantaneously and create a bubble. The ink at the orifice is forced out as a propelled droplet as the bubble expands. When the hydrodynamic motion of the ink stops, the process is ready to start all over again. With the introduction of a droplet ejection system based upon thermally generated bubbles, commonly referred to as the "bubble jet" system, the drop-on-demand ink jet printers provide simpler, lower cost devices than their continuous stream counterparts, and yet have substantially the same high speed printing capability.

The operating sequence of the bubble jet system begins with a current pulse through the resistive layer in the ink filled channel, the resistive layer being in close proximity to the orifice or nozzle for that channel. Heat is transferred from the resistor to the ink. The ink becomes superheated far above its normal boiling point, and for water based ink, finally reaches the critical temperature for bubble formation or nucleation of around 280° C. Once nucleated, the bubble or water vapor thermally isolates the ink from the heater and no further heat can be applied to the ink. This bubble expands until all the heat stored in the ink in excess of the normal boiling point diffuses away or is used to convert liquid to vapor, which removes heat due to heat of vaporization. The expansion of the bubble forces a droplet of ink out of the nozzle, and once the excess heat is removed, the bubble collapses on the resistor. At this point, the resistor is no longer being heated because the current pulse has passed and, concurrently with the bubble collapse, the droplet is propelled at a high rate of speed in a direction towards a recording medium. The resistive layer encounters a severe cavitational force by the collapse of the bubble, which tends to erode it. Subsequently, the ink channel refills by capillary action. This entire bubble formation and collapse sequence occurs in about 10 microseconds. The channel can be refired after 100 to 500 microseconds minimum dwell time to enable the channel to be refilled and to enable the dynamic refilling factors to become somewhat dampened. Thermal ink jet processes are well known and are described in, for example, U.S. Pat. No. 4,601,777, U.S. Pat. No. 4,251,824, U.S. Pat. No. 4,410,899, U.S. Pat. No. 4,412,224, and U.S. Pat. No. 4,532,530, the disclosures of each of which are totally incorporated herein by reference.

Acoustic ink jet printing processes are also known. As is known, an acoustic beam exerts a radiation pressure against objects upon which it impinges. Thus, when an acoustic beam impinges on a free surface (i.e., liquid/air interface) of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power. These principles have been applied to prior ink jet and acoustic printing proposals. For example, K. A. Krause, "Focusing Ink Jet Head," *IBM Technical Disclosure Bulletin*, Vol. 16, No. 4, September 1973, pp. 1168–1170, the disclosure of which is totally incorporated herein by reference, describes an ink jet in which an acoustic beam emanating from a concave surface and confined by a conical aperture was used to propel ink droplets out through a small ejection orifice. Acoustic ink printers typically comprise one or more acoustic radiators for illuminating the free surface of a pool of liquid ink with respective acoustic beams. Each of these beams usually is brought to focus at or near the surface of the reservoir (i.e., the liquid/air interface). Furthermore, printing conventionally is performed by independently modulating the excitation of the acoustic radiators in accordance with the input data samples for the image that is to be printed. This modulation enables the radiation pressure which each of the beams exerts against the free ink surface to make brief, controlled excursions to a sufficiently high pressure level for overcoming the restraining force of surface tension. That, in turn, causes individual droplets of ink to be ejected from the free ink surface on demand at an adequate velocity to cause them to deposit in an image configuration on a nearby recording medium. The acoustic beam may be intensity modulated or focused/defocused to control the ejection timing, or an external source may be used to extract droplets from the acoustically excited liquid on the surface of the pool on demand. Regardless of the timing mechanism employed, the size of the ejected droplets is determined by the waist diameter of the focused acoustic beam. Acoustic ink printing is attractive because it does not require the nozzles or the small ejection orifices which have caused many of the reliability and pixel placement accuracy problems that conventional drop-on-demand and continuous stream ink jet printers have suffered. The size of the ejection orifice is a critical design parameter of an ink jet because it determines the size of the droplets of ink that the jet ejects. As a result, the size of the ejection orifice cannot be increased, without sacrificing resolution. Acoustic printing has increased intrinsic reliability because there are no nozzles to clog. As will be appreciated, the elimination of the clogged nozzle failure mode is especially relevant to the reliability of large arrays of ink ejectors, such as page width arrays comprising several thousand separate ejectors. Furthermore, small ejection orifices are avoided, so acoustic printing can be performed with a greater variety of inks than conventional ink jet printing, including inks having higher viscosities and inks containing pigments and other particulate components. It has been found that acoustic ink printers embodying printheads comprising acoustically illuminated spherical focusing lenses can print precisely positioned pixels (i.e., picture elements) at resolutions which are sufficient for high quality printing of relatively complex images. It has also has been discovered that the size of the individual pixels printed by such a printer can be varied over a significant range during operation, thereby accommodating, for example, the printing of variably shaded images. Furthermore, the known droplet ejector technology can be adapted to a variety of printhead configurations, including (1) single ejector embodiments for raster scan printing, (2) matrix configured ejector arrays for matrix printing, and (3) several different types of pagewidth ejector arrays, ranging from single row, sparse arrays for hybrid forms of parallel/serial printing to multiple row staggered arrays with individual ejectors for each of the pixel positions or addresses within a pagewidth image field (i.e., single ejector/pixel/line) for ordinary line printing. Inks suitable for acoustic ink jet printing typically are liquid at ambient temperatures (i.e., about 25° C.), but in other embodiments the ink is in a solid state at ambient temperatures and provision is made for liquefying the ink by heating or any other suitable method prior to introduction of the ink into the printhead. Images of two or more colors can be generated by several methods, including by processes wherein a single printhead launches acoustic waves into pools of different colored inks. Further information regarding acoustic ink jet printing apparatus and processes is disclosed in, for example, U.S. Pat. No. 4,308,547, U.S. Pat. No. 4,697,195, U.S. Pat. No. 5,028,937, U.S. Pat. No. 5,041,849, U.S. Pat. No. 4,751,529, U.S. Pat. No. 4,751,530, U.S. Pat. No. 4,751,534, U.S. Pat. No. 4,801,953, and U.S. Pat. No. 4,797,693, the disclosures of each of which are totally incorporated herein by reference. The use of focused acoustic beams to eject droplets of controlled diameter and velocity from a free-liquid surface is also described in *J. Appl. Phys.*, vol. 65, no. 9 (May 1, 1989) and references therein, the disclosure of which is totally incorporated herein by reference.

Other known droplet ejectors include those of the type disclosed in, for example, U.S. Pat. No. 6,127,198, the disclosure of which is totally incorporated herein by reference.

U.S. Pat. No. 6,001,899 (Gundlach et al.), the disclosure of which is totally incorporated herein by reference, discloses an ink composition which comprises water, an anionic dye, and a polyquaternary amine compound selected from the group consisting of polydiallyl ammonium compounds, polyquaternized polyvinylamines, polyquaternized polyallylamines, and mixtures thereof. Also disclosed are methods for using the aforementioned ink composition in ink jet printing processes.

U.S. Pat. No. 6,054,505 (Gundlach et al.), the disclosure of which is totally incorporated herein by reference, discloses an ink composition which comprises (1) water; (2) a nonpolymeric salt comprising at least one cation and at least one anion; and (3) a colorant comprising an anionic dye complexed with a polyquaternary amine compound. Also disclosed is an ink composition which comprises (1) water; (2) a nonpolymeric salt comprising at least one cation and at least one anion; (3) an anionic dye, and (4) a polyquaternary amine compound. In one embodiment, the polyquaternary amine compound is selected from the group consisting of polydiallyl ammonium compounds, polyquaternized polyvinylamines, polyquaternized polyallylamines, epichlorohydrin/amine copolymers, cationic amino amine copolymers, copolymers of vinyl pyrrolidinone and a vinyl imidazolium salt, and mixtures thereof.

U.S. Pat. No. 6,005,022 (Schwarz), the disclosure of which is totally incorporated herein by reference, discloses an ink composition which comprises (1) water; (2) a dye; and (3) a cationic amino amine copolymer. Also disclosed are methods for using the aforementioned ink composition in ink jet printing processes.

U.S. Pat. No. 5,990,198 (Schwarz), the disclosure of which is totally incorporated herein by reference, discloses an ink composition which comprises (1) water; (2) an anionic dye; and (3) a copolymer of vinyl pyrrolidinone and a vinyl imidazolium salt. Also disclosed are methods for using the aforementioned ink compositions in ink jet printing processes.

U.S. Pat. No. 6,258,873 (Gundlach et al.), the disclosure of which is totally incorporated herein by reference, discloses an ink composition which comprises water, an acid dye, a monovalent salt, a polyquaternary amine compound, and an optional nonionic or cationic surfactant, said ink being substantially free of organic solvents. The ink is particularly suitable for applications such as ink jet printing and marking pens. The disclosed inks in some embodiments are substantially indelible. Also disclosed is a composition for removing the ink compositions from substrates to which they have been applied which comprises water and a dianionic surfactant, optionally further containing a salt, urea, and/or a viscosity building agent such as a gum.

U.S. Pat. No. 6,274,645 (Gundlach et al.), the disclosure of which is totally incorporated herein by reference, discloses a washing composition which comprises a linear alkyl diphenyl oxide disulfonate compound, a chloride, bromide, iodide, nitrate, acetylacetonate, polyphosphate, squarate, or sulfonate salt or mixtures thereof, and a cosolvent which is propylene glycol, dipropylene glycol, tripropylene glycol, diethylene glycol, glycerine, trimethylolethane, trimethylolpropane, or mixtures thereof.

U.S. Pat. No. 6,174,355 (Mayo et al.), the disclosure of which is totally incorporated herein by reference, discloses an ink composition comprising a colorant and poly(diallyl diethyl ammonium) bromide. Also disclosed are ink jet printing processes, including thermal ink jet and acoustic ink jet printing processes, for using the inks.

JP 11099740, the disclosure of which is totally incorporated herein by reference, discloses an ink jet recording sheet having superior light fastness of a recorded image, particularly superior light fastness of a magenta image, and also superior characteristics such as recording density and recording quality. At least one kind of compound like N-2-[3-(benzotriazole-2-yl)-4-hydroxyphenyl propionyl amino]ethyl-N,N,N-trimethyl ammonium chloride and others by a general formula

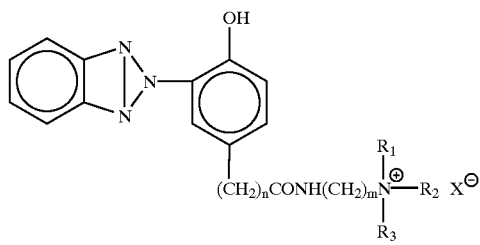

is contained in an ink jet recording sheet for forming a recorded image by using aqueous ink. In the formula, $R_1$, $R_2$, and $R_3$ respectively represent hydrogen atom, $C_1$–$C_4$ alkyl or $C_1$–$C_4$ hydroxyalkyl and X represents organic or inorganic anion. (n) represents 0, 1, or 2 and (m) represents an integer of 2 to 6.

JP 2000141875, the disclosure of which is totally incorporated herein by reference, discloses a superior ink jet recording sheet of superior light fastness of a recorded image, particularly light fastness of a magenta image and free from the yellowing of surface, the deterioration of the picture quality and the like. A recorded image is formed on an ink jet recording sheet by using an aqueous ink, and in the recording sheet, at least one kind of benzotrizol compound represented by the formula

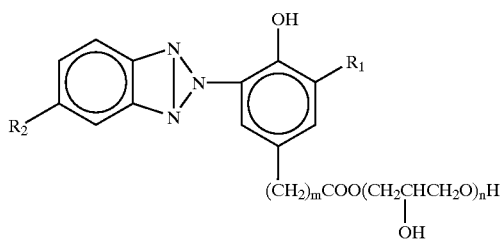

3-[3-(benzotriazol-2-yl)-4-hydroxyphenyl]decaglyceryl propionate or the like is contained in the recording sheet. In the formula, $R_1$ represents a hydrogen atom or a 1–5C alkyl, and $R_2$ represents a hydrogen atom or a chlorine atom. (m) represents 0 or 1–4 integer and (n) represents 1–12 integer.

JP 10140475 A2, the disclosure of which is totally incorporated herein by reference, discloses the improvement of the lightfastness of a dyed material of a polyester fiber product or a conjugated fiber product containing the fiber and prevention of the strength from deteriorating by adding a textile treating agent comprising an aqueous dispersion of a specific benzotriazole-based compound into a dye bath or a printing color paste. This textile treating agent for textile products is obtained by preparing a 5–50 weight percent aqueous dispersion of at least one compound represented by the formula

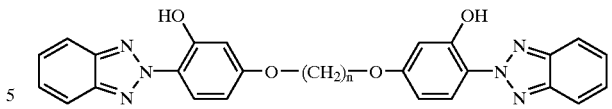

[(n) is an integer of 2–6; X is H, a halogen or tertiary butyl], e.g. 1,4-bis[4-(2H-benzotriazol-2-yl)-3-hydroxyphenoxy] butane. When a polyester fiber product or a conjugated fiber product containing the polyester fiber is dyed or printed with a disperse dye, etc., the treating agent in an amount of 0.2–10 percent based on the fiber weight is added into a dye bath or a printing color paste.

While known compositions and processes are suitable for their intended purposes, a need remains for improved aqueous inks. In addition, a need remains for aqueous inks particularly suitable for use in ink jet printing processes. Further, a need remains for ink compositions with improved waterfastness. Additionally, a need remains for ink compositions with improved wet smear resistance. There is also a need for ink compositions with reduced intercolor bleed when two or more colors are printed adjacent to each other. In addition, there is a need for ink compositions for ink jet printing which contain acid dyes, which enable advantages such as bright colors, low cost, and high waterfastness when complexed with cationic polymers. Further, there is a need for ink compositions with improved shelf stability. Additionally, there is a need for ink compositions with improved jetting characteristics. A need also remains for ink compositions which exhibit excellent smear resistance. In addition, a need remains for ink compositions which are heat stable. Further, a need remains for ink compositions which exhibit freeze/thaw stability. Additionally, a need remains for ink compositions suitable for use in ink jet printing processes and having relatively low viscosities. There is also a need for ink compositions with one or more of the above advantages and also with improved lightfastness.

SUMMARY OF THE INVENTION

The present invention is directed to an ink composition comprising (a) water, (b) an anionic dye, (c) a polyquaternary amine compound, and (d) a quaternary ammonium substituted UV absorbing compound. Another embodiment of the present invention is directed to an ink composition comprising (a) water, (b) a complex of (i) an anionic dye and (ii) a polyquaternary amine compound, and (c) a quaternary ammonium substituted UV absorbing compound.

DETAILED DESCRIPTION OF THE INVENTION

Inks of the present invention contain an aqueous liquid vehicle, an anionic dye, a polyquaternary amine compound, and a quaternary ammonium substituted UV absorbing compound, The liquid vehicle can consist solely of water, or it can comprise a mixture of water and a water soluble or water miscible organic component, such as ethylene glycol, propylene glycol, diethylene glycols, glycerine, dipropylene glycols, polyethylene glycols, polypropylene glycols, amides, ethers, urea, substituted ureas, ethers, carboxylic acids and their salts, esters, alcohols, organosulfides, organosulfoxides, sulfones (such as sulfolane), alcohol derivatives, carbitol, butyl carbitol, cellusolve, tripropylene glycol monomethyl ether, ether derivatives, amino alcohols, ketones, N-methylpyrrolidinone, 2-pyrrolidinone, cyclohexylpyrrolidone, hydroxyethers, amides, sulfoxides, lactones, polyelectrolytes, methyl sulfonylethanol, imidazole, betaine, and other water soluble or water miscible materials, as well as mixtures thereof. When mixtures of water and water soluble or miscible organic liquids are selected as the liquid vehicle, the water to organic ratio typically ranges from about 100:0 to about 30:70, and preferably from about 97:3 to about 40:60. The non-water component of the liquid vehicle generally serves as a humectant or cosolvent which has a boiling point higher than that of water (100° C.). In the ink compositions of the present invention, the liquid vehicle is typically present in an amount of from about 80 to about 99.9 percent by weight of the ink, and preferably from about 90 to about 99 percent by weight of the ink, although the amount can be outside these ranges.

The polyquaternary amine compound, which generally is complexed with the anionic dye in the ink, is a polymer containing quaternary groups in the repeat units thereof. The polymer typically has a weight average molecular weight of from about 1,000 to about 10,000,000, preferably from about 3,000 to about 1,000,000, and more preferably from about 5,000 to about 400,000, although the value can be outside of these ranges. The polymer typically has a number average molecular weight of from about 800 to about 11,000,000, preferably from about 3,300 to about 1,100,000, and more preferably from about 5,600 to about 450,000, although the value can be outside of these ranges. The polymer typically has from about 5 to about 70,000 repeat monomer units therein, preferably from about 21 to about 7,000 repeat monomer units, and more preferably from about 35 to about 2,800 repeat monomer units, although the number of repeat monomer units can be outside of this range. Suitable polyquaternary amine compounds typically are of the general formulae

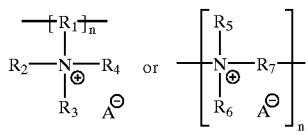

wherein n is an integer representing the number of repeat monomer units, $R_1$ and $R_7$ each, independently of the other, is an alkylene group, including saturated, unsaturated, cyclic, and substituted alkylene groups (wherein hetero atoms, such as oxygen, sulfur, nitrogen, silicon, phosphorus, and the like can be present in the alkylene group), typically with from 1 to about 30 carbon atoms and preferably with from 1 to about 6 carbon atoms, an arylene group, including substituted arylene groups, typically with from 6 to about 50 carbon atoms and preferably with from 6 to about 18 carbon atoms, an arylalkylene group, including substituted arylalkylene groups, typically with from 7 to about 60 carbon atoms and preferably with from 7 to about 20 carbon atoms, or an alkylarylene group, including substituted alkylarylene groups, typically with from 7 to about 60 carbon atoms and preferably with from 7 to about 20 carbon atoms, and $R_2$, $R_3$, $R_4$, $R_5$, and $R_6$ each, independently of the others, are hydrogen atoms, alkyl groups, including saturated, unsaturated, cyclic, and substituted alkyl groups (wherein hetero atoms, such as oxygen, sulfur, nitrogen, silicon, phosphorus, and the like can be present in the alkyl group), typically with from 1 to about 30 carbon atoms and preferably with from 1 to about 6 carbon atoms, aryl groups, including substituted aryl groups, typically with from 6 to about 50 carbon atoms and preferably with from 6 to about 18 carbon atoms, arylalkyl groups, including substituted arylalkyl groups, typically with from 7 to about 60 carbon atoms and preferably with from 7 to about 20 carbon atoms, or alkylaryl groups, including substituted alkylaryl groups, typically with from 7 to about 60 carbon atoms and preferably with from 7 to about 20 carbon atoms, wherein the substituents on the substituted alkyl, alkylene, aryl, arylene, arylalkyl, arylalkylene, alkylaryl, and alkylarylene groups can be (but are not limited to) hydroxy groups, amine groups, carbonyl groups, sulfide groups, halogen atoms, mixtures thereof, and the like, wherein two or more substituents can be joined together to form a ring.

Examples of suitable polyquaternary amine compounds include polydiallyl ammonium compounds, of the general formula

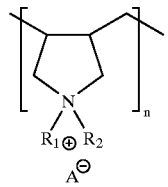

wherein n is an integer representing the number of repeat monomer units, $R_1$ and $R_2$ each, independently of the other, are hydrogen atoms, alkyl groups, including saturated, unsaturated, cyclic, and substituted alkyl groups (wherein hetero atoms, such as oxygen, sulfur, nitrogen, silicon, phosphorus, and the like can be present in the alkyl group), typically with from 1 to about 30 carbon atoms and preferably with from 1 to about 6 carbon atoms, aryl groups, including substituted aryl groups, typically with from 6 to about 50 carbon atoms and preferably with from 6 to about 18 carbon atoms, arylalkyl groups, including substituted arylalkyl groups, typically with from about 7 to about 60 carbon atoms and preferably with from 7 to about 20 carbon atoms, or alkylaryl groups, including substituted alkylaryl groups, typically with from about 7 to about 60 carbon atoms and preferably with from 7 to about 20 carbon atoms, wherein the substituents on the substituted alkyl aryl, arylalkyl, and alkylaryl groups can be (but are not limited to) hydroxy groups, amine groups, carbonyl groups, sulfide groups, halogen atoms, mixtures thereof, and the like, wherein two or more substituents can be joined together to form a ring, and A is an anion, such as $Cl^-$, $Br^-$, $I^-$, $HSO_4^-$, $HSO_3^-$, $SO_4^{2-}$, $SO_3^{2-}$, $CH_3SO_3^-$, $CH_3C_6H_4SO_{3-}$, $NO_3^-$, $HCOO^-$, $CH_3COO^-$, $H_2PO_4^-$, $HPO_4^{2-}$, $SCN^-$, $BF_{4-}$, $ClO_4^-$, $SSO_3^-$, $PF_6^-$, $SbCl_6^-$, or the like, such as polydiallyl dimethyl ammonium compounds, including polydiallyl dimethyl ammonium chloride, of the formula

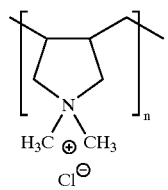

wherein n is an integer representing the number of repeat monomer units, commercially available with a molecular weight of about 400,000 (wherein n is an integer of about 2,500) from Calgon Corp. as 261-RV, and with a molecular weight of about 5,000 (wherein n is an integer of about 31) from Calgon Corp. as VARIKEM 110 or E2253.

Also suitable are polyquaternized polyvinylamines, of the general formula

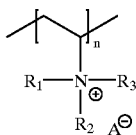

wherein n is an integer representing the number of repeat monomer units, $R_1$, $R_2$, and $R_3$ each, independently of the others, are hydrogen atoms, alkyl groups, including saturated, unsaturated, cyclic, and substituted alkyl groups (wherein hetero atoms, such as oxygen, sulfur, nitrogen, silicon, phosphorus, and the like can be present in the alkyl group), typically with from 1 to about 30 carbon atoms and preferably with from 1 to about 6 carbon atoms, aryl groups, including substituted aryl groups, typically with from 6 to about 50 carbon atoms and preferably with from about 6 to about 18 carbon atoms, arylalkyl groups, including substituted arylalkyl groups, typically with from 7 to about 60 carbon atoms and preferably with from 7 to about 20 carbon atoms, or alkylaryl groups, including substituted alkylaryl groups, typically with from 7 to about 60 carbon atoms and preferably with from 7 to about 20 carbon atoms, wherein the substituents on the substituted alkyl, aryl, arylalkyl, and alkylaryl groups can be (but are not limited to) hydroxy groups, amine groups, carbonyl groups, sulfide groups, halogen atoms, mixtures thereof, and the like, wherein two or more substituents can be joined together to form a ring, and A is an anion, such as $Cl^-$, $Br^-$, $I^-$, $HSO_4^-$, $HSO_3^-$, $SO_4^{2-}$, $SO_3^{2-}$, $CH_3SO_3^-$, $CH_3C_6H_4SO_3^-$, $NO_3^-$, $HCOO^-$, $CH_3COO^-$, $H_2PO_4^-$, $HPO_4^{2-}$, $SCN^-$, $BF_4^-$, $ClO_4^-$, $SSO_3^-$, $PF_6^-$, $SbCl_6^-$, or the like.

Also suitable are polyquaternized polyallylamines, of the general formula

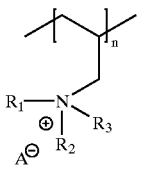

wherein n is an integer representing the number of repeat monomer units, $R_1$, $R_2$, and $R_3$ each, independently of the others, are hydrogen atoms, alkyl groups, including saturated, unsaturated, cyclic, and substituted alkyl groups (wherein hetero atoms, such as oxygen, sulfur, nitrogen, silicon, phosphorus, and the like can be present in the alkyl group), typically with from 1 to about 30 carbon atoms and preferably with from 1 to about 6 carbon atoms, aryl groups, including substituted aryl groups, typically with from 6 to about 50 carbon atoms and preferably with from about 6 to about 18 carbon atoms, arylalkyl groups, including substituted arylalkyl groups, typically with from 7 to about 60 carbon atoms and preferably with from 7 to about 20 carbon atoms, or alkylaryl groups, including substituted alkylaryl groups, typically with from 7 to about 60 carbon atoms and preferably with from 7 to about 20 carbon atoms, wherein the substituents on the substituted alkyl, aryl, arylalkyl, and alkylaryl groups can be (but are not limited to) hydroxy groups, amine groups, carbonyl groups, sulfide groups, halogen atoms, mixtures thereof, and the like, wherein two or more substituents can be joined together to form a ring, and A is an anion, such as $Cl^-$, $Br^-$, $I^-$, $HSO_4^-$, $HSO_3^-$, $SO_4^{2-}$, $SO_3^{2-}$, $CH_3SO_3^-$, $CH_3C_6H_4SO_3^-$, $NO_3^-$, $HCOO^-$, $CH_3COO^-$, $H_2PO_4^-$, $HPO_4^{2-}$, $SCN^-$, $BF_4^-$, $ClO_4^-$, $SSO_3^-$, $PF_6^-$, $SbCl_6^-$, or the like.

Also suitable are epichlorohydrin/amine copolymers, including those of the general formula

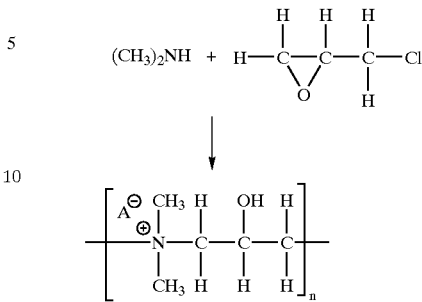

wherein n is an integer of from about 3 to about 3,000, and preferably from about 5 to about 100, although the value can be outside of these ranges, and A is any suitable or desired anion, such as $Cl^-$, $Br^-$, $I^-$, $HSO_4^-$, $HSO_3^-$, $SO_4^{2-}$, $SO_3^{2-}$, $CH_3SO_3^-$, $CH_3C_6H_4SO_3^-$, $NO_3^-$, $HCOO^-$, $CH_3COO^-$, $H_2PO_4^-$, $HPO_4^{2-}$, $SCN^-$, $BF_4^-$, $ClO_4^-$, $SSO_3^-$, $PF_6^-$, $SbCl_6^-$, or the like. Polymers of this formula are commercially available from Hercules, Wilmington, Del. as RETEN 200 or RETEN 201 (molecular weight generally less than 10,000), and from Cytex, Inc., West Patterson, N.J., as CYPRO 514, 515, and 516 (wherein the polymers have a molecular weight range of from about 75,000 to about 250,000 and n is from about 870 to about 3,000), and as SUPERFLOC C567 (wherein the polymer has a molecular weight of about 10,000 and n is from about 110 to about 120, typically about 116).

Also suitable are cationic amino amine copolymers. Examples of suitable cationic amino amine copolymers include those of the general formula

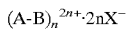

$(A-B)_n^{2n+} \cdot 2nX^-$ wherein X is an anion, such as $Cl^-$, $Br^-$, $I^-$, $HSO_4^-$, $HSO_3^-$, $SO_4^{2-}$, $SO_3^{2-}$, $CH_3SO_3^-$, $CH_3C_6H_4SO_3^-$, $NO_3^-$, $HCOO^-$, $CH_3COO^-$, $H_2PO_4^{31}$, $HPO_4^{2-}$, $SCN^-$, $BF_4^-$, $ClO_4^-$, $SSO_3^-$, $PF_6^-$, $SbCl_6^-$, or the like, n is an integer representing the number of repeating monomer units, and typically is from about 2 to about 1,000, preferably from about 3 to about 200, more preferably from about 3 to about 100, and even more preferably from about 3 to about 10, although the value can be outside of these ranges, "A" is

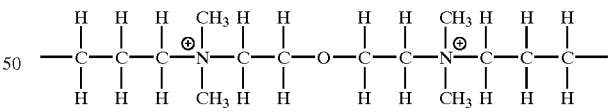

and "B" is selected from the group consisting of (a) monomers of the formula

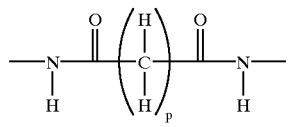

wherein p is an integer representing the number of repeat monomer units, and typically is from 1 to about 12, preferably from 1 to about 7, and more preferably from 1 to about 4, although the value can be outside of these ranges, such as (i) azeleic acid diamido, wherein p is 7, of the formula

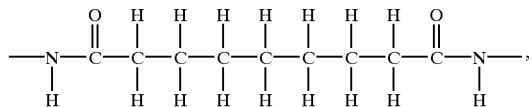

or (ii) adipic acid diamido, wherein p is 4, of the formula

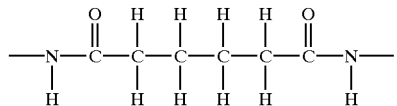

and (b) ureido, of the formula

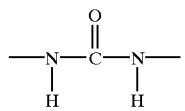

Mixtures of two or more "B" monomers can also be used within the polymer. In a preferred embodiment, these specific polymers typically are condensation polymers, with alternating "A" and "B" monomer units. The weight average molecular weight of the polymer typically is from about 1,000 to about 100,000, preferably from about 1,000 to about 30,000, and more preferably from about 2,000 to about 5,000, although the value can be outside of these ranges. Copolymers of an amine and an amide are commercially available from, for example, Rhone-Poulenc, Cranbury, N.J., as, for example, MIRAPOL AZ-1, of the above formula wherein the "B" monomer is azeleic acid diamido, n has an average value of about 100, and the molecular weight is about 50,000, MIRAPOL AD-1, of the above formula wherein the "B" monomer is adipic acid diamido, n has an average value of about 100, and the molecular weight is about 50,000, and MIRAPOL A-15, of the above formula wherein the "B" monomer is ureido, n has an average value of about 6, and the molecular weight is about 2,260.

Also suitable are copolymers of vinyl pyrrolidinone and a vinyl imidazolium salt. In one embodiment, the copolymer is of a vinyl imidazolium salt of the formula

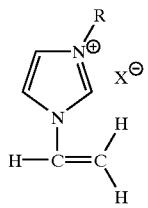

wherein X is an anion and R is a hydrogen atom or an alkyl group, typically with from 1 to about 8 carbon atoms and preferably with from 1 to about 3 carbon atoms, and vinyl pyrrolidinone, of the formula

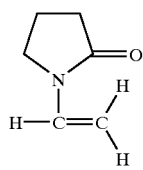

wherein the copolymer is of the general formula

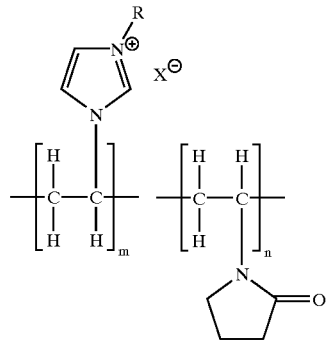

wherein X is any suitable or desired anion, such as $Cl^-$, $Br^-$, $I^-$, $HSO_4^-$, $HSO_3^-$, $SO_4^{2-}$, $SO_3^{2-}$, $CH_3SO_3^-$, $CH_3C_6H_4SO_3^-$, $NO_3^-$, $HCOO^-$, $CH_3COO^-$, $H_2PO_4^-$, $HPO_4^{2-}$, $SCN^-$, $BF_4^-$, $ClO_4^-$, $SSO_3^-$, $PF_6^-$, $SbCl_6^-$, or the like, R is a hydrogen atom or an alkyl group, typically with from 1 to about 8 carbon atoms, and preferably with from 1 to about 3 carbon atoms, m is a integer representing the number of repeat vinyl imidazolium units, and n is an integer representing the number of repeat vinyl pyrrolidinone units. When R is a hydrogen atom, the pH of the ink can be adjusted to provide optimal ink-paper interaction; for example, the hydrogen atom can be extracted upon contact with the paper, or the cationic character of the polymer can be adjusted with ink pH. Random copolymers of the above formula generally are preferred, although alternating and block copolymers are also suitable. The weight average molecular weight of the polymer typically is from about 1,000 to about 1,000,000, preferably from about 1,000 to about 100,000, and more preferably from about 2,000 to about 5,000, although the value can be outside of these ranges. The ratio of vinyl imidazolium monomers to vinyl pyrrolidinone monomers typically is from about 99:1 to about 5:95, preferably from about 95:5 to about 20:80, more preferably from about 95:5 to about 30:70, and even more preferably from about 95:5 to about 50:50, although the value can be outside of these ranges. Vinyl pyrrolidinone/vinyl imidazolium salt copolymers are commercially available; for example, BASF, Parsippany, N.J., provides vinyl imidazolium chloride/vinyl pyrrolidinone copolymers (of the above formula wherein R is $CH_3$) with a molecular weight of about 100,000 in three monomer ratios: LUVIQUAT® FC905 has a vinyl imidazolium chloride:vinyl pyrrolidinone ratio of 95:5 with 6.7 milliequivalents per gram of cationic groups, LUVIQUAT® FC550 has a vinyl imidazolium chloride:vinyl pyrrolidinone ratio of 50:50 with 3.0 milliequivalents per gram of cationic groups, and LUVIQUAT® FC370 has a vinyl imidazolium chloride:vinyl pyrrolidinone ratio of 30:70 with 1.8 milliequivalents per gram of cationic groups. Also available from BASF is LUVIQUAT® HM552, with a molecular weight of about 800,000 and a vinyl imidazolium chloride:vinyl pyrrolidinone ratio of 50:50.

Mixtures of two or more polyquaternary amine compounds can also be present in the ink.

The polyquaternary amine compound is present in the ink in any desired or effective amount, typically at least about 0.01 percent by weight of the ink, more typically at least about 0.05 percent by weight of the ink, and preferably at least about 1 percent by weight of the ink, and typically up to about 50 percent by weight of the ink, more typically up to about 40 percent by weight of the ink, preferably up to about 10 percent by weight of the ink, more preferably up to about 9 percent by weight of the ink, and even more preferably up to about 5 percent by weight of the ink, although the amount can be outside of these ranges. The preferred relative amounts of polyquaternary amine and anionic dye in the ink can also be expressed as a stoichiometric ratio, with the molar ratio of anionic dye groups to cationic polyquaternary groups typically being at least about 1:0.33, preferably at least about 1:1, more preferably at least about 1:2, and even more preferably at least about 1:3, and typically up to about 1:300, preferably up to about 1:20, and more preferably up to about 1:6, although the relative amounts can be outside of these ranges.

Ink compositions according to the present invention also include an anionic dye. Any suitable anionic dye or mixture of anionic dyes compatible with the ink liquid vehicle can be used. Examples of suitable dyes include Food dyes such as Food Black No. 1, Food Black No. 2, Food Red No. 40, Food Blue No. 1, Food Yellow No. 7, and the like, FD & C dyes, Acid Black dyes (No. 1, 7, 9, 24, 26, 48, 52, 58, 60, 61, 63, 92, 107, 109, 118, 119, 131, 140, 155, 156, 172, 194, and the like), Acid Red dyes (No. 1, 8, 32, 35, 37, 52, 57, 92, 115, 119, 154, 249, 254, 256, and the like), Acid Blue dyes (No. 1, 7, 9, 25, 40, 45, 62, 78, 80, 92, 102, 104, 113, 117, 127, 158, 175, 183, 193, 209, and the like), Acid Yellow dyes (No. 3, 7, 17, 19, 23, 25, 29, 38, 42, 49, 59, 61, 72, 73, 114, 128, 151, and the like), Direct Black dyes (No. 4, 14, 17, 22, 27, 38, 51, 112, 117, 154, 168, and the like), Direct Blue dyes (No. 1, 6, 8, 14, 15, 25, 71, 76, 78, 80, 86, 90, 106, 108, 123, 163, 165, 199, 226, and the like), Direct Red dyes (No. 1, 2, 16, 23, 24, 28, 39, 62, 72, 236, and the like), Direct Yellow dyes (No. 4, 11, 12, 27, 28, 33, 34, 39, 50, 58, 86, 100, 106, 107, 118, 127, 132, 142, 157, and the like), anthraquinone dyes, monoazo dyes, disazo dyes, phthalocyanine derivatives, including various phthalocyanine sulfonate salts, aza(18)annulenes, formazan copper complexes, triphenodioxazines, Bernacid Red 2BMN; Pontamine Brilliant Bond Blue A; Pontamine; Caro direct Turquoise FBL Supra Conc. (Direct Blue 199), available from Carolina Color and Chemical; Special Fast Turquoise 8GL Liquid (Direct Blue 86), available from Mobay Chemical; Intrabond Liquid Turquoise GLL (Direct Blue 86), available from Crompton and Knowles; Cibracron Brilliant Red 38-A (Reactive Red 4), available from Aldrich Chemical; Drimarene Brilliant Red X-2B (Reactive Red 56), available from Pylam, Inc.; Levafix Brilliant Red E-4B, available from Mobay Chemical; Levafix Brilliant Red E-6BA, available from Mobay Chemical; Procion Red H8B (Reactive Red 31), available from ICI America; Pylam Certified D&C Red #28 (Acid Red 92), available from Pylam; Direct Brilliant Pink B Ground Crude, available from Crompton & Knowles; Cartasol Yellow GTF Presscake, available from Sandoz, Inc.; Tartrazine Extra Conc. (FD&C Yellow #5, Acid Yellow 23), available from Sandoz; Carodirect Yellow RL (Direct Yellow 86), available from Carolina Color and Chemical; Cartasol Yellow GTF Liquid Special 110, available from Sandoz, Inc.; D&C Yellow #10 (Acid Yellow 3), available from Tricon; Yellow Shade 16948, available from Tricon, Basacid Black X34, available from BASF, Carta Black 2GT, available from Sandoz, Inc.; Neozapon Red 492 (BASF); Savinyl Blue GLS (Sandoz); Luxol Blue MBSN (Morton-Thiokol); Basacid Blue 750 (BASF); Bernacid Red, available from Berncolors, Poughkeepsie, N.Y.; Pontamine Brilliant Bond Blue; Berncolor A.Y. 34; Telon Fast Yellow 4GL-175; BASF Basacid Black SE 0228; the PRO-JET® series of dyes available from ICI, including PRO-JET® Yellow I (Direct Yellow 86), PRO-JET® Magenta I (Acid Red 249), PRO-JET® Cyan I (Direct Blue 199), PRO-JET® Black I (Direct Black 168), PRO-JET® Yellow 1-G (Direct Yellow 132), Aminyl Brilliant Red F-B, available from Sumitomo Chemical Company (Japan), the DUASYN® line of "salt-free" dyes available from Hoechst, such as DUASYN® Direct Black HEF-SF (Direct Black 168), DUASYN® Black RL-SF (Reactive Black 31), DUASYN® Direct Yellow 6G-SF VP216 (Direct Yellow 157), DUASYN® Brilliant Yellow GL-SF VP220 (Reactive Yellow 37), DUASYN® Acid Yellow XX-SF LP413 (Acid Yellow 23), DUASYN® Brilliant Red F3B-SF VP218 (Reactive Red 180), DUASYN® Rhodamine B-SF VP353 (Acid Red 52), DUASYN® Direct Turquoise Blue FRL-SF VP368 (Direct Blue 199), DUASYN® Acid Blue AE-SF VP344 (Acid Blue 9), various Reactive dyes, including Reactive Black dyes, Reactive Blue dyes, Reactive Red dyes, Reactive Yellow dyes, and the like, as well as mixtures thereof.

The dye is present in the ink composition in any desired or effective amount, typically at least about 0.05 percent by weight of the ink, preferably at least about 0.1 percent by weight of the ink, and more preferably at least about 1 percent by weight of the ink, and typically no more than about 15 percent by weight of the ink, preferably no more than about 10 percent by weight of the ink, and more preferably no more than about 7 percent by weight of the ink, although the amount can be outside of these ranges.

While not being limited to any particular theory, it is believed that the polyquaternary amine and the anionic dye form an ionic complex upon admixing of the ink ingredients. While the ink ingredients can be mixed in any desired order, it is preferred that any salts present in the ink be added prior to addition of the dye or the polyquaternary amine.

Inks according to the present invention also contain a quaternary ammonium substituted UV absorbing compound. Any known or effective UV absorbing compound can be employed provided that it is or can be substituted with a quaternary ammonium group. Example of classes of suitable UV absorbing compounds include (but are not limited to) 2-[3-(2H-benzotriazol-2-yl)-4-hydroxyphenyl]quaternary compounds, of the general formulae

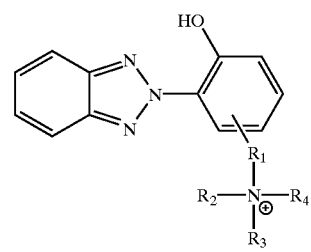

-continued

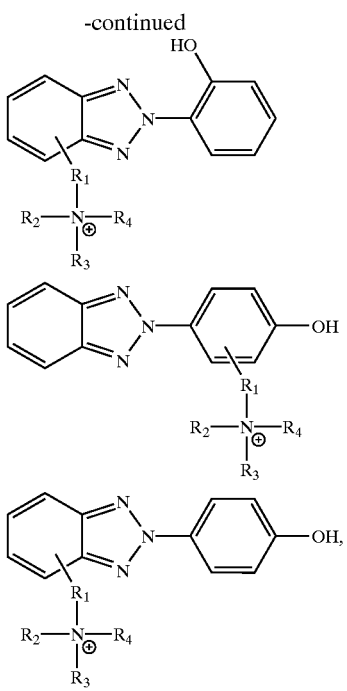

hydroxybenzophenone quaternary compounds, of the general formulae

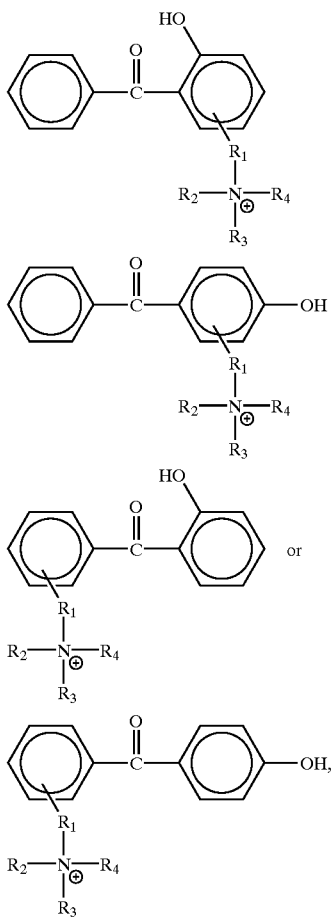

quaternary ammonium derivatives of dialkylaminobenzoates, of the general formula

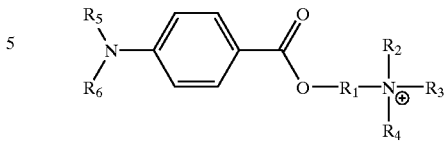

wherein $R_5$ and $R_6$ each, independently of the other, is an alkyl group, typically with from 1 to about 6 carbon atoms, although the number of carbon atoms can be outside of this range, or an arylalkyl group, typically with from about 7 to about 12 carbon atoms, such as a benzyl group, although the number of carbon atoms can be outside of this range, and the like, wherein $R_1$ is an alkylene group (including linear, branched, saturated, cyclic, and substituted alkylene groups, and wherein hetero atoms, such as oxygen, sulfur, nitrogen, silicon, phosphorus, or the like, can be placed between the carbon atoms in the alkylene group), typically with from 1 to about 10 carbon atoms, and preferably with from 1 to about 4 carbon atoms, although the number of carbon atoms can be outside of this range, an arylalkylene group (including substituted arylalkylene groups), typically with from 7 to about 20 carbon atoms, more preferably with from 7 to about 13 carbon atoms, although the number of carbon atoms can be outside of this range, or a polyalkyleneoxy group (including substituted polyalkyleneoxy groups), typically polyethyleneoxy groups or polypropyleneoxy groups, typically with from 2 to about 22 repeat alkyleneoxy units, and preferably with from 2 to about 10 repeat alkyleneoxy units, although the number of repeat alkyleneoxy units can be outside of these ranges, and $R_2$, $R_3$, and $R_4$ each, independently of the others, is a hydrogen atom, an alkyl group (including linear, branched, saturated, unsaturated, cyclic, and substituted alkyl groups, and wherein hetero atoms, such as oxygen, sulfur, nitrogen, silicon, phosphorus, or the like, can be placed between the carbon atoms in the alkyl group), typically with from 1 to about 10 carbon atoms, and preferably with from 1 to about 4 carbon atoms, although the number of carbon atoms can be outside of this range, an aryl group (including substituted aryl groups), typically with from 6 to about 18 carbon atoms, more preferably with from 6 to about 12 carbon atoms, although the number of carbon atoms can be outside of this range, an arylalkyl group (including substituted arylalkyl groups), typically with from 7 to about 20 carbon atoms, more preferably with from 7 to about 13 carbon atoms, although the number of carbon atoms can be outside of this range, an alkylaryl group (including substituted alkylaryl groups), typically with from 7 to about 20 carbon atoms, more preferably with from 7 to about 13 carbon atoms, although the number of carbon atoms can be outside of this range, an alkoxy group (including substituted alkoxy groups), typically with from 1 to about 10 carbon atoms, and preferably with from 1 to about 4 carbon atoms, although the number of carbon atoms can be outside of this range, or a polyalkyleneoxy group (including substituted polyalkyleneoxy groups), typically polyethyleneoxy groups or polypropyleneoxy groups, typically with from 2 to about 22 repeat alkyleneoxy units, and preferably with from 2 to about 10 repeat alkyleneoxy units, although the number of repeat alkyleneoxy units can be outside of these ranges, wherein the substituents on the substituted alkyl, alkylene, aryl, arylene, arylalkyl, arylalkylene, alkylaryl, alkylarylene, alkoxy, alkyleneoxy, and polyalkyleneoxy groups can be (but are not limited to) halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, mixtures thereof, and the like, as well as mixtures thereof, and wherein two or more substituents can be joined together to form a ring.

The 2-[3-(2H-benzotriazol-2-yl)-4-hydroxyphenyl] quaternary compounds can be prepared by any desired or suitable method. For example, N-2-(3-(benzotriazole-2-yl)-4-hydroxyphenyl propionyl amino) ethyl-N,N,N-trimethyl ammonium chloride can be made by the synthetic process outlined below:

reacted stoichiometrically with 2-(4-hydroxyphenyl) propionic acid to yield the corresponding azo compound. Dissolution in 2N NaOH and addition of Zn dust, followed by dropwise additon of 50 percent NaOH over a period of about one hour to a reaction mixture held at 45° C. yields the desired 2-hydroxyphenybenzotriazole. 2-[3-(2H-benzotriazol-2-yl)-4-hydroxyphenyl)propionic acid is isolated by acidification with hydrochloric acid and isolation of the crystalline precipitated product is by filtration. 2-[3-(2H-benzotriazol-2-yl)-4-hydroxyphenyl)propionyl aminoethyl-trimethylammonium chloride is obtained by stoichiometric reaction of a solution of 2-[3-(2H-benzotriazol-2-yl)-4-hydroxyphenyl)propionic acid in a mixture of acetic acid and dimethylformamide, with thionyl chloride, added dropwise, to generate 2-[3-(2H-benzotriazol-2-yl)-4-hydroxyphenyl)propionyl chloride. The acid chloride is

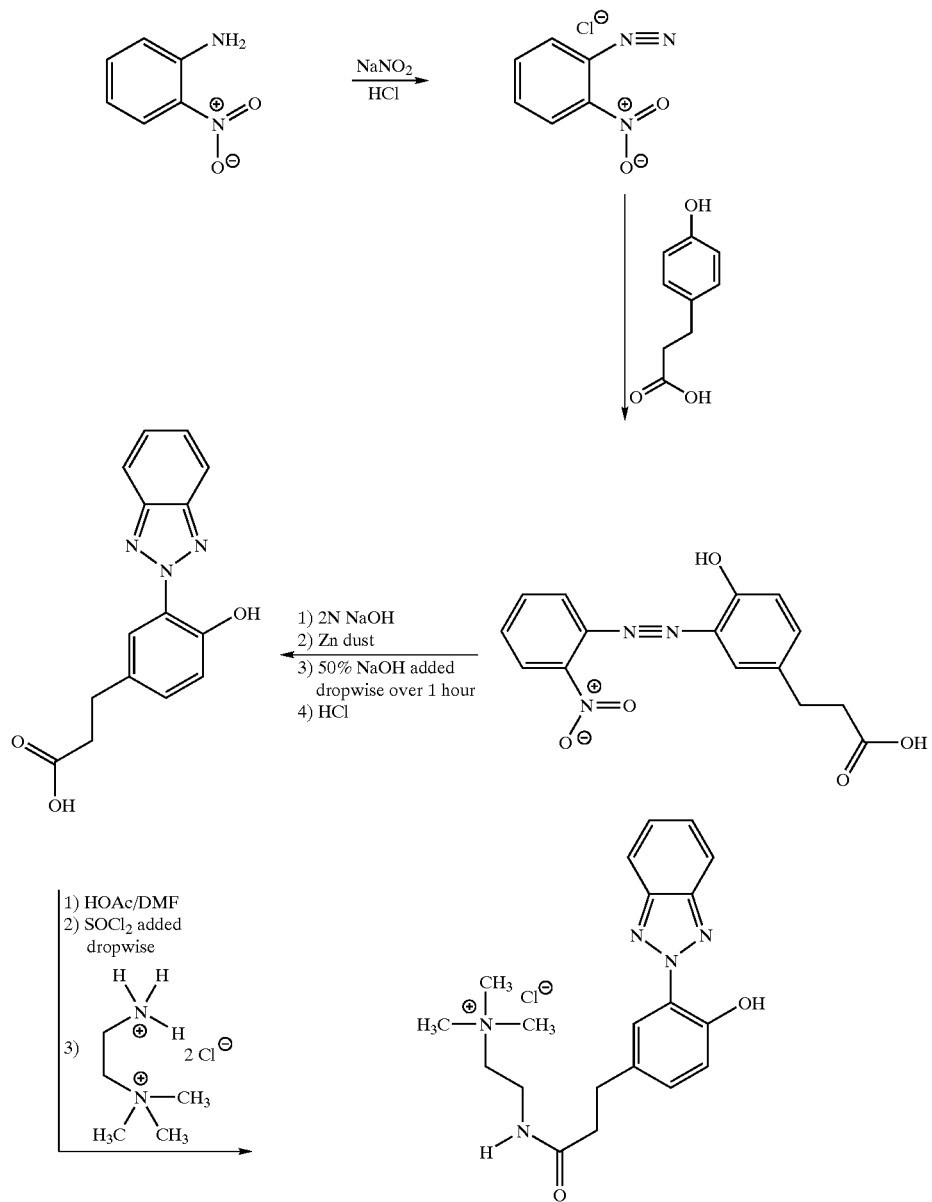

2-Nitroaniline is reacted with sodium nitrite in hydrochloric acid to yield the diazonium salt. The diazonium salt is reacted in situ with 2-aminoethyl(trimethylammonium chloride hydrochloride to yield 2-[3-(2H-benzotriazol-2-yl)-4- hydroxyphenyl)propionyl aminoethyl-trimethylammonium chloride, which is isolated by dilution with water and filtration. In all of the reactions in this sequence the reation mixture is cooled in a water bath to hold the reaction temperature at about 25° C.

The quaternary dimethylaminobenzoic acid derivative

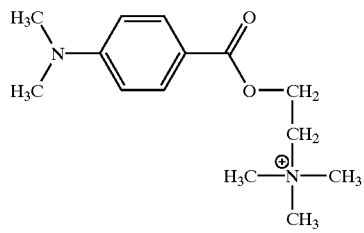

can be synthesized by the reaction of dimethylaminobenzoic acid with choline chloride in the presence of thionyl chloride.

The quaternary ammonium substituted UV absorbing compound is present in the ink in any desired or effective amount, typically at least about 0.05 percent by weight, preferably at least about 0.1 percent by weight, and more preferably at least about 0.25 percent by weight, and more and typically no more than about 10 percent by weight, preferably no more than about 3 percent by weight, and more preferably no more than about 1 percent by weight, although the amount can be outside of these ranges.

While not being limited to any particular theory, it is believed that the quaternary ammonium substituted UV absorbing compound would not be soluble or effective in an ink composition that did not contain the polyquaternary amine compound, and that the quaternary ammonium substituted UV absorbing compound would precipitate the anionic dye in such an ink, In inks of the present invention, however, the quaternary ammonium substituted UV absorbing compound is compatible with the other ink ingredients and enables images of desirable lightfastness to be generated, The inks of the present invention preferably further contain a nonpolymeric salt comprising at least one cation and at least one anion. Examples of suitable cations include alkali metal cations, such as $Li^+$, $Na^+$, and $K^+$, alkaline earth metal cations, such as $Mg^{2+}$ and $Ca^{2+}$, $Al^{3+}$, nonpolymeric or monomeric ammonium and quaternary amine cations, including those of the general formula

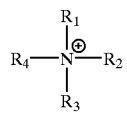

wherein each of $R_1$, $R_2$, $R_3$, and $R_4$, independently of the others, is a hydrogen atom, an alkyl group (including saturated, unsaturated, cyclic, and substituted alkyl groups, wherein substituted alkyl groups can include alkoxy or polyalkoxy groups such as ethylene oxide, polyethylene oxide, or the like), preferably with from 1 to about 10 carbon atoms and more preferably with from 1 to about 4 carbon atoms, although the number of carbon atoms can be outside of this range, aryl groups, including substituted aryl groups, preferably with from 6 to about 18 carbon atoms and more preferably with from 6 to about 12 carbon atoms, although the number of carbon atoms can be outside of this range, or arylalkyl groups, preferably with from 7 to about 20 carbon atoms and more preferably with from 7 to about 13 carbon atoms, wherein the substituents on the substituted alkyl, aryl, arylalkyl, and alkylaryl groups can be (but are not limited to) hydroxy groups, amine groups, ammonium groups, cyano groups, pyridine groups, pyridinium groups, ether groups, aldehyde groups, ketone groups, ester groups, amide groups, carbonyl groups, sulfide groups, sulfoxide groups, phosphine groups, phosphonium groups, nitrile groups, mercapto groups, nitroso groups, halogen atoms, nitro groups, sulfone groups, acyl groups, mixtures thereof, and the like, wherein two or more substituents can be joined together to form a ring, with specific examples of ammonium and quaternary amine cations including $NH_4^+$, $N(CH_3)_4^+$, $H_3NCH_2CH_2NH_3^{2+}$, $(H_3C)_3NCH_2CH_2N(CH_3)_3^{2+}$, imidazolium, quaternized 1,4-diazabicyclo(2.2.2)octane, choline, of the formula

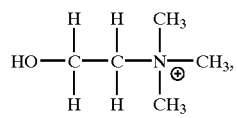

alkyl amine quaternary salts such as ETHOQUAD C/12, of the formula

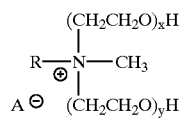

wherein R is a long chain alkyl group with 12 carbon atoms, x and y are integers of 0, 1, or 2 representing the number of ethoxy groups, wherein x+y=2, and A is an anion, such as chloride, commercially available from Akzo Chemie, Chicago, Ill., and the like, as well as mixtures thereof. Any desired anion can be employed. Examples of suitable anions include $NO_3^-$, $ClO_4^-$, $SO_4^{2-}$, $PF_6^-$, $BF_4^-$, strong organic acid anions, such as tosylate, mesylate, trifalte, trifluoroacetate, sulfmate, squarate, of the formula

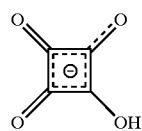

and the like, weak organic acid anions, such as formate, acetate, propionate, and the like, acetylacetonate, of the formula

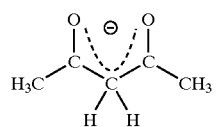

halides, including chloride, bromide, and iodide, and the like, as well as mixtures thereof. Specific examples of suitable salts include lithium chloride, lithium bromide, lithium iodide, lithium nitrate, lithium formate, lithium acetate, lithium propionate, sodium chloride, sodium bromide, sodium iodide, sodium nitrate, sodium perchlorate, sodium formate, sodium acetate, sodium propionate, potassium chloride, potassium bromide, potassium iodide, potassium formate, potassium acetate, potassium propionate, calcium chloride, calcium nitrate, calcium formate, calcium acetate, calcium propionate, magnesium chloride, magnesium sulfate, magnesium formate, magnesium acetate, magnesium propionate, ammonium chloride, ammonium bromide, ammonium iodide, ammonium acetate, ammonium formate, ammonium nitrate, ammonium sulfate, ammonium propionate, tetramethylammonium chloride, tetramethylammonium formate, tetramethylammonium acetate, tetramethylammonium propionate, ethylene diamine dihydrochloride, 1,4-diazabicyclo(2.2.2)octane salts, such as hexamethonium bromide, of the formula

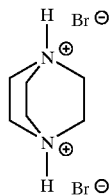

imidazole salts, such as imidazolium chloride, acetylacetonate salts, such as lithium acetylacetonate, squarate salts, such as tetramethylammonium squarate, choline salts, such as choline chloride, ETHOQUAD C/12, and the like. The salt is present in the ink in any desired or effective amount, typically at least about 0.1 percent by weight of the ink, preferably at least about 1 percent by weight of the ink, and more preferably at least about 5 percent by weight of the ink, and typically no more than about 40 percent by weight of the ink, preferably no more than about 30 percent by weight of the ink, more preferably no more than about 20 percent by weight of the ink, and even more preferably no more than about 15 percent by weight of the ink, although the amount can be outside of these ranges.

While not being limited to any particular theory, it is believed that the presence of the salt suppresses the extent to which the complex is associated in solution and thereby solubilizes the dye/quaternary polymer in the inks of the present invention. Again, while not being limited to any particular theory, it is believed that within the ink, the polyquaternary amine tends to be associated with the anionic dye, with the dye playing the role of a counterion. The complex is rendered soluble in the ink vehicle by virtue of the presence of water soluble ionic salts, the anions of which limit the extent of association of anionic dyes with the quaternary polymer in solution. The presence of the salt in the ink can also reduce jitter when the ink is jetted and increase ink surface tension.

Other optional additives to the inks include biocides such as Dowicil 150, 200, and 75, benzoate salts, sorbate salts, and the like, present in an amount of from about 0.0001 to about 4 percent by weight of the ink, and preferably from about 0.01 to about 2.0 percent by weight of the ink, pH controlling agents such as acids or, bases, phosphate salts, carboxylates salts, sulfite salts, amine salts, and the like, present in an amount of from 0 to about 1 percent by weight of the ink and preferably from about 0.01 to about 1 percent by weight of the ink, or the like.

When used in ink jet printing applications, the ink compositions according to the present invention are generally of a viscosity suitable for use in said ink jet printing processes. For example, for thermal ink jet printing applications, at room temperature (i.e., about 25° C.), typically, the ink viscosity is typically at least about 1 centipoise and typically is up to about 10 centipoise, preferably up to about 5 centipoise, and more preferably up to about 4 centipoise, although the viscosity can be outside these ranges, particularly when the ink is used for applications such as acoustic ink jet printing. When used in marking pen applications, the ink compositions are generally of a viscosity suitable for use in said applications.

The ink compositions can be of any suitable or desired pH. For some embodiments, such as thermal ink jet printing processes, typical pH values are at least about 3, preferably at least about 5, and more preferably at least about 6, and typically up to about 11, preferably up to about 10, and more preferably up to about 9, although the pH can be outside of these ranges.

The ink compositions can be prepared by any suitable process. Typically, the inks are prepared by simple mixing of the ingredients. One process entails mixing all of the ink ingredients together and filtering the mixture to obtain an ink. Inks can be prepared by mixing the ingredients, heating if desired, and filtering, followed by adding any desired additional additives to the mixture and mixing at room temperature with moderate shaking until a homogeneous mixture is obtained, typically from about 5 to about 10 minutes, Alternatively, the optional ink additives can be mixed with the other ink ingredients during the ink preparation process, which takes place according to any desired procedure, such as by mixing all the ingredients, heating if desired, and filtering.

The ink compositions of the present invention can be used in a process which entails incorporating the ink composition into an ink jet printing apparatus and causing droplets of the ink composition to be ejected in an imagewise pattern onto a substrate. In a particularly preferred embodiment, the printing apparatus employs a thermal ink jet process wherein the ink in the nozzles is selectively heated in an imagewise pattern, thereby causing droplets of the ink to be ejected in imagewise pattern. In another embodiment, the printing apparatus employs an acoustic ink jet process wherein droplets of the ink are caused to be ejected in imagewise pattern by acoustic beams. In yet another embodiment, the printing apparatus employs a piezoelectric ink jet process, wherein droplets of the ink are caused to be ejected in imagewise pattern by oscillations of piezoelectric vibrating elements. Any suitable substrate can be employed, including plain papers such as XEROX® 4024 papers, XEROX® Image Series papers, Courtland 4024 DP paper, ruled notebook paper, bond paper, silica coated papers such as Sharp Company silica coated paper, JuJo paper, and the like, transparency materials, fabrics, textile products, plastics, polymeric films, inorganic substrates such as metals and wood, and the like. In a preferred embodiment, the process entails printing onto a porous or ink absorbent substrate, such as plain paper.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

2-[3-(2H-Benzotriazol-2-yl)-4-hydroxyphenyl)propionyl aminoethyl-trimethylammonium chloride was prepared by the following scheme:

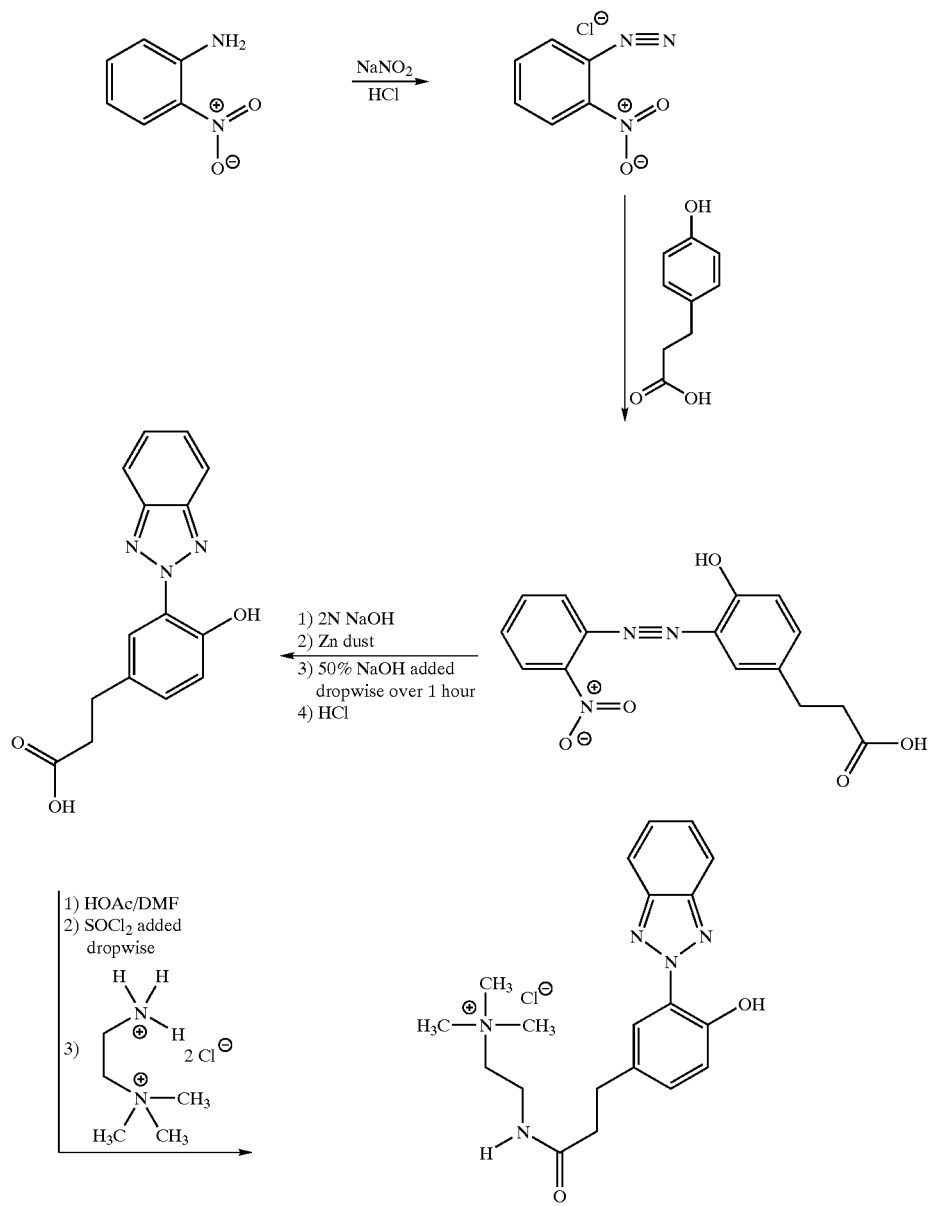

2-Nitroaniline was reacted with sodium nitrite in hydrochloric acid to yield the diazonium salt. The diazonium salt was reacted stoichiometrically with 2-(4-hydroxyphenyl)propionic acid to yield the corresponding azo compound. Dissolution in 2N NaOH and addition of Zn dust, followed by dropwise additon of 50 percent NaOH over a period of about one hour to a reaction mixture held at 45° C. yielded the desired 2-hydroxyphenybenzotriazole. 2-[3-(2H-benzotriazol-2-yl)-4-hydroxyphenyl)propionic acid was isolated by acidification with hydrochloric acid and isolation of the crystalline precipitated product was by filtration. 2-[3-(2H-benzotriazol-2-yl)-4-hydroxyphenyl)propionyl aminoethyl-trimethylammonium chloride was obtained by stoichiometric reaction of a solution of 2-[3-(2H-benzotriazol-2-yl)-4-hydroxyphenyl)propionic acid in a mixture of acetic acid and dimethylformamide, with thionyl chloride, added dropwise, to generate 2-[3-(2H-benzotriazol-2-yl)-4-hydroxyphenyl)propionyl chloride. The acid chloride was reacted in situ with 2-aminoethyl (trimethylammonium chloride hydrochloride to yield 2-[3-(2H-benzotriazol-2-yl)-4-hydroxyphenyl)propionyl aminoethyl-trimethylammonium chloride, which was isolated by dilution with water and filtration. In all of the reactions in this sequence the reation mixture was cooled in a water bath to hold the reaction temperature at about 25° C.

An ink composition was prepared containing 10 parts by weight of 2-pyrrolidinone, 5 parts by weight of choline chloride, 20 parts by weight of sulfolane (containing 95 percent by weight pure sulfolane and 5 percent by weight water), 6 parts by weight of an aqueous solution containing 30 percent by weight of polydimethyldiallyl ammonium chloride (CALGON® CP-1030, obtained from Calgon Corp.), 26.9 parts by weight of deionized water, 5 parts by weight of PROJET® RED OAM dye (Acid Red 52; aqueous solution containing 8.5 percent by weight dye solids), 25 parts by weight of PROJET® Magenta 1-3BOA dye (aqueous solution containing 10 percent by weight dye solids) 1 part by weight N-octyl-2-pyrrolidinone, and 0.5 parts by weight of 2-[3-(2H-benzotriazol-2-yl)-4-hydroxyphenyl)propionyl aminoethyl-trimethylammonium chloride.

For comparison purposes, a control ink was made of identical composition except that (a) it contained no 2-[3-(2H-benzotriazol-2-yl)-4-hydroxyphenyl)propionyl aminoethyl-trimethylammonium chloride or other lightfastness agent, (b) it contained 6.6 parts by weight of the polydimethyldiallyl ammonium chloride aqueous solution, and (c) it contained 27.4 parts by weight of deionized water.

Evaluation of Lightfastness

Differences in solid area optical density were measured with an optical densitometer (X-RITE Model 428) and were evaluated for solid area test patterns (1.25-inch solid squares) printed with a XEROX® M-750 printer on XEROX® Hi-Tech Ink Jet paper and FOLEX photo paper. Samples for exposure were cut from the test print area, mounted, and exposed for 48 hours in an ATLAS Model 25 FR Xenon Fadeometer equipped with a 2500 watt lamp, a borosilicate glass inner filter (275 nm cutoff), and a soda lime glass outer filter (320 nm cutoff). This combination of light filters closely approximated sunlight passing through window glass. The prints were aged in the dark for 24 hours before making lightfastness measurements. Irradiance was 0.75 Watts per square meter and total irradiation was 129.6 KiloJoules per square meter. Black panel temperature was 63° C. Nominal relative humidity was 35 percent.

The lightfastness values of the inks containing 2-(3-(2H-benzotriazol-2-yl)-4-hydroxyphenyl)propionyl aminoethyl-trimethylammonium chloride were improved compared to those of the control ink. After 48 hours of exposure in the ATLAS Model 25 FR Xenon Fadeometer, the solid area images printed with the control ink of suffered a 90 percent reduction in optical density. Solid area images printed with the quaternary hydroxyphenylbenzotriazole-containing inks and exposed in the same test suffered a reduction in optical density of only 30 percent.

EXAMPLE II

The choline chloride ester of N,N-dimethylaminobenzoic acid

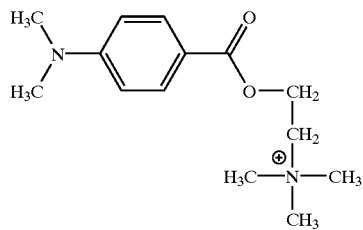

was prepared by the reaction of dimethylaminobenzoic acid with choline chloride in the presence of thionyl chloride, An ink composition was prepared containing 10 parts by weight of 2-pyrrolidinone (containing 95 percent by weight pure 2-pyrrolidinone and 5 percent by weight water; obtained from BASF, Mt. Olive, N.J.), 5 parts by weight of choline chloride (obtained from Aldrich Chemical Co., Milwaukee, Wis.), 20 parts by weight of sulfolane (containing 95 percent by weight pure sulfolane and 5 percent by weight water; obtained from Phillips Petroleum Co., Bartlesville, Okla.), 6 parts by weight of an aqueous solution containing 30 percent by weight of polydimethyldiallyl ammonium chloride (CALGON® CP-1030, obtained from Calgon Corp.), 26.9 parts by weight of deionized water, 5 parts by weight of PROJET® RED OAM dye (Acid Red 52; aqueous solution containing 8.5 percent by weight dye solids; obtained from Avecia, Inc., Wilmington, Del.), 25 parts by weight of PROJET® Magenta 1-3BOA dye (aqueous solution containing 10 percent by weight dye solids; obtained from Avecia, Inc., Wilmington, Del.), 1 part by weight N-octyl-2-pyrrolidinone (obtained from Aldrich Chemical Co., Milwaukee, Wis.), and 0.5 parts by weight of the choline chloride ester of N,N-dimethylaminobenzoic acid.

For comparison purposes, a control ink was made of identical composition except that it contained no choline chloride ester of N,N-dimethylaminobenzoic acid lightfastness agent. Lightfastness of the two inks was evaluated by the method described in Example I.

The lightfastness values of the inks containing the choline chloride ester of N,N-dimethylaminobenzoic acid were improved compared to that of the control ink. After 48 hours of exposure in the ATLAS Model 25 FR Xenon Fadeometer, the solid area images printed with the control ink of suffered a 90 percent reduction in optical density. Solid area images printed with the choline chloride ester of N,N-dimethylaminobenzoic acid-containing inks and exposed in the same test suffered a reduction in optical density of only 50 percent, Other embodiments and modifications of the present invention may occur to those of ordinary skill in the art subsequent to a review of the information presented herein; these embodiments and modifications, as well as equivalents thereof, are also included within the scope of this invention.

The recited order of processing elements or sequences, or the use of numbers, letters, or other designations therefor, is not intended to limit a claimed process to any order except as specified in the claim itself.

What is claimed is:

1. An ink composition comprising (a) water, (b) an anionic dye, (c) a polyquoternary amine compound, and (d) a quaternary ammonium subsilluted UV absorbing compound of the formula

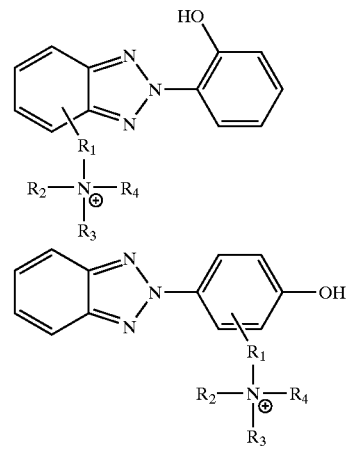

-continued

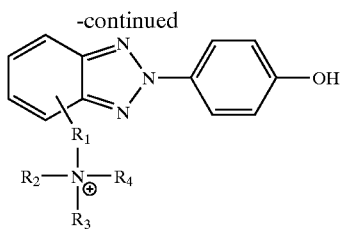

or mixtures thereof, wherein $R_1$ is an arylalkylene group, or a polyalkyleneoxy group, and $R_2$, $R_3$, and $R_4$ each, independently of the others, is a hydrogen atom, an alkyl group, an aryl group, an arylalkyl group, an alkylaryl group, an alkoxy group, or a polyalkyleneoxy group.

2. An ink composition according to claim 1 wherein the polyquaternary amine compound is of one of the formulae

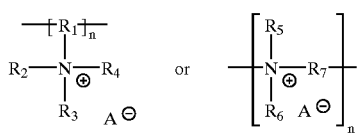

wherein n is an integer representing the number of repeat monomer units, $R_1$ and $R_7$ each, independently of the other, is an alkylene group, an arylene group, an arylalkylene group, or an alkylarylene group, and $R_2$, $R_3$, $R_4$, $R_5$, and $R_6$ each, independently of the others, are hydrogen atoms, alkyl groups, aryl groups, arylalkyl groups, or alkylaryl groups.

3. An ink composition according to claim 1 wherein the polyquaternary amine compound is selected from the group consisting of polydiallyl ammonium compounds, polyquaternized polyvinylamines, polyquaternized polyallylamines, epichlorohydrin/amine copolymers, cationic amido amine copolymers, copolymers of vinyl pyrrolidinone and a vinyl imidazolium salt, and mixtures thereof.

4. An ink composition according to claim 1 wherein the polyquaternary amine compound is a polydiallyl dimethyl ammonium compound.

5. An ink composition according to claim 1 wherein the polyquaternary amine compound is present in the ink in an amount of at least about 0.01 percent by weight of the ink and wherein the cationic polymer is present in the ink in an amount of no more than about 50 percent by weight of the ink.

6. An ink composition according to claim 1 wherein the quaternary ammonium substituted UV absorbing compound is present in the ink in an amount of at least about 0.05 percent by weight of the ink, and wherein the quaternary ammonium substituted UV absorbing compound is present in the ink in an amount of no more than about 10 percent by weight.

7. An ink composition according to claim 1 wherein the ink further contains a nonpolymeric salt.

8. An ink composition according to claim 1 wherein the quaternary ammonium substituted UV absorbing compound is of the general formula

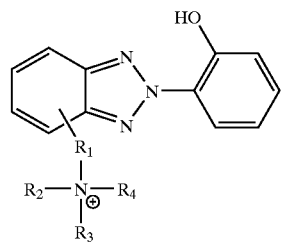

wherein $R_1$ is an alkylene group, an arylalkylene group, or a polyalkyleneoxy group, and $R_2$, $R_3$, and $R_4$ each, independently of the others, is a hydrogen atom, an alkyl group, an aryl group, an arylalkyl group, an alkylaryl group, an alkoxy group, or a polyalkyleneoxy group.

9. An ink composition according to claim 1 wherein the quaternary ammonium substituted UV absorbing compound is of the general formula

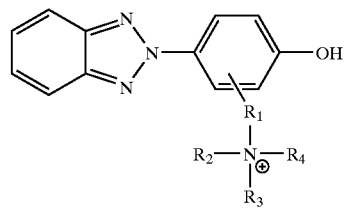

wherein $R_1$ is an alkylene group, an arylalkylene group, or a polyalkyleneoxy group, and $R_2$, $R_3$, and $R_4$ each, independently of the others, is a hydrogen atom, an alkyl group, an aryl group, an arylalkyl group, an alkylaryl group, an alkoxy group, or a polyalkyleneoxy group.

10. An ink composition according to claim 1 wherein the quaternary ammonium substituted UV absorbing compound is of the general formula

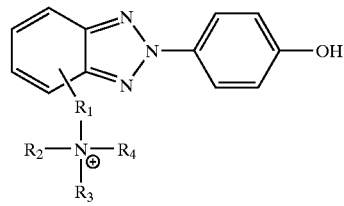

wherein $R_1$ is an alkylene group, an arylalkylene group, or a polyalkyleneoxy group, and $R_2$, $R_3$, and $R_4$ each, independently of the others, is a hydrogen atom, an alkyl group, an aryl group, an arylalkyl group, an alkylaryl group, an alkoxy group, or a polyalkyleneoxy group.

11. An ink composition comprising (a) water, (b) a complex of (i) an anionic dye and (ii) a polyquaternary amine compound, and (c) a quaternary ammonium substituted UV absorbing compound of the formula

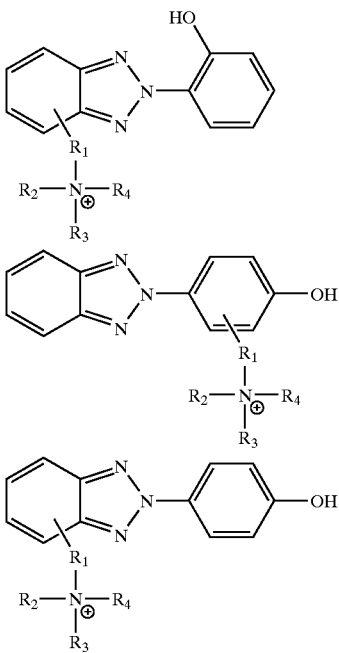

or mixtures thereof, wherein $R_1$ is an arylalkylene group, or a polyalkyleneoxy group, and $R_2$, $R_3$, and $R_4$ each, independently of the others, is a hydrogen atom, an alkyl group, an aryl group, an arylalkyl group, an alkylaryl group, an alkoxy group, or a polyalkyleneoxy group.

12. An ink composition according to claim 11 wherein the polyquaternary amine compound is of one of the formulae

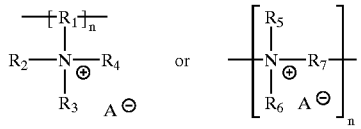

wherein n is an integer representing the number of repeat monomer units, $R_1$ and $R_7$ each, independently of the other, is an alkylene group, an arylene group, an arylalkylene group, or an alkylarylene group, and $R_2$, $R_3$, $R_4$, $R_5$, and $R_6$ each, independently of the others, are hydrogen atoms, alkyl groups, aryl groups, arylalkyl groups, or alkylaryl groups.

13. An ink composition according to claim 11 wherein the polyquaternary amine compound is selected from the group consisting of polydiallyl ammonium compounds, polyquaternized polyvinylamines, polyquaternized polyallylamines, epichlorohydrin/amine copolymers, cationic amido amine copolymers, copolymers of vinyl pyrrolidinone and a vinyl imidazolium salt, and mixtures thereof.

14. An ink composition according to claim 11 wherein the polyquoternary amine compound is a polydiallyl dimethyl ammonium compound.

15. An ink composition according to claim 11 wherein the polyquoternary amine compound is present in the ink in an amount of at least about 0.01 percent by weight of the ink and wherein the cationic polymer is present in the ink in an amount of no more than about 50 percent by weight of the ink.

16. An ink composition according to claim 11 wherein the quaternary ammonium substituted UV absorbing compound is present in the ink in an amount of at least about 0.05 percent by weight of the ink and wherein the quaternary ammonium substituted UV absorbing compound is present in the ink in an amount of no more than about 10 percent by weight.

17. An ink composition according to claim 11 wherein the ink further contains a nonpolymeric salt.

18. An ink composition according to claim 11 wherein the quaternary ammonium substituted UV absorbing compound is of the general formula

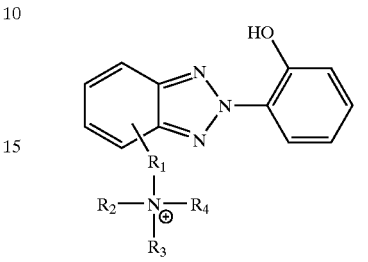

wherein $R_1$ is an alkylene group, an arylalkylene group, or a polyalkyleneoxy group, and $R_2$, $R_3$, and $R_4$ each, independently of the others, is a hydrogen atom, an alkyl group, an aryl group, an arylalkyl group, an alkylaryl group, an alkoxy group, or a polyalkyleneoxy group.

19. An ink composition according to claim 11 wherein the quaternary ammonium substituted UV absorbing compound is of the general formula

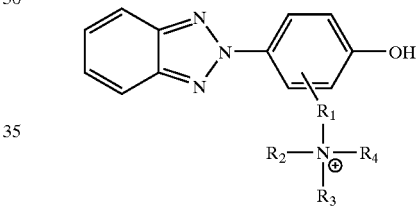

wherein $R_1$ is an alkylene group, an arylalkylene group, or a polyalkyleneoxy group, and $R_2$, $R_3$, and $R_4$ each, independently of the others, is a hydrogen atom, an alkyl group, an aryl group, an arylalkyl group, an alkylaryl group, an alkoxy group, or a polyalkyleneoxy group.

20. An ink composition according to claim 11 wherein the quaternary ammonium substituted UV absorbing compound is of the general formula

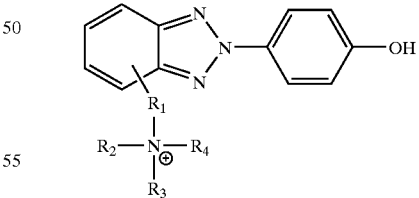

wherein $R_1$ is an alkylene group, an arylalkylene group, or a polyalkyleneoxy group, and $R_2$, $R_3$, and $R_4$ each, independently of the others, is a hydrogen atom, an alkyl group, an aryl group, an arylalkyl group, an alkylaryl group, an alkoxy group, or a polyalkyleneoxy group.

21. A process which comprises incorporating into an ink jet printing apparatus an ink composition comprising (a) water, (b) an anionic dye, (c) a quaternary ammonium substituted UV absorbing compound of the formula

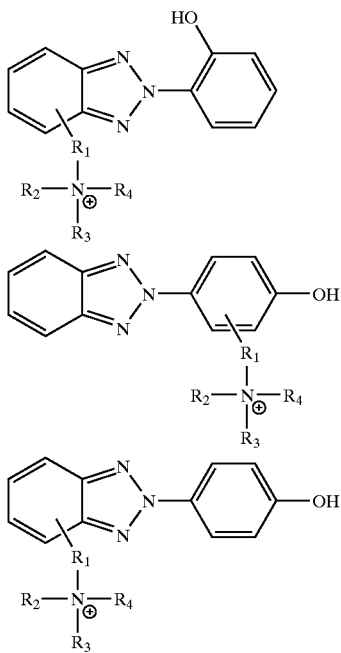

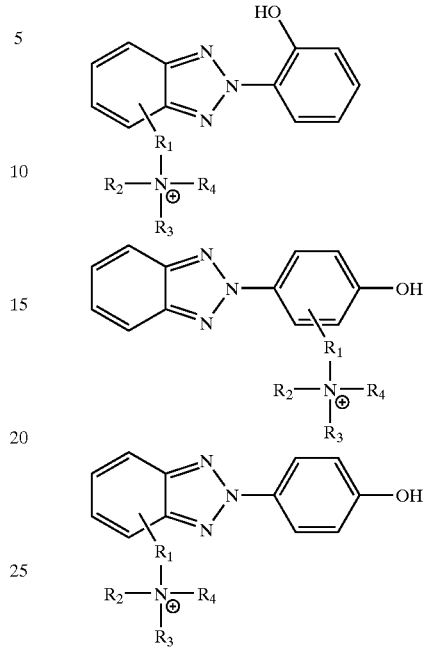

or mixtures thereof, wherein $R_1$ is an arylalkylene group, or a polyalkyleneoxy group, and $R_2$, $R_3$, and $R_4$ each, independently of the others, is a hydrogen atom, an alkyl group, an aryl group, an arylalkyl group, an alkylaryl group, an alkoxy group, or a polyalkyleneoxy group, and (d) a polyquaternary amine compound and causing droplets of the inks to be ejected in an imagewise pattern onto a recording substrate.

22. A process according to claim 21 wherein the printing apparatus employs a thermal ink jet process wherein the ink in the nozzles is selectively heated in an imagewise pattern, thereby causing droplets of the ink to be ejected in imagewise pattern.

23. A process according to claim 21 wherein the printing apparatus employs a piezoelectric ink jet process wherein droplets of the ink are caused to be ejected in imagewise pattern by oscillations of piezoelectric vibrating elements.

24. A process which comprises incorporating into an ink jet printing apparatus an ink composition comprising (a) water, (b) a complex of (i) an anionic dye and (ii) a polyquaternary amine compound, and (c) a quaternary ammonium substituted UV absorbing compound of the formula or mixtures thereof, wherein $R_1$ is an arylalkylene group, or a polyalkyleneoxy group, and $R_2$, $R_3$, and $R_4$ each, independently of the others, is a hydrogen atom, an alkyl group, an aryl group, an arylalkyl group, an alkylaryl group, an alkoxy group, or a polyalkyleneoxy group and causing droplets of the inks to be ejected in an imagewise pattern onto a recording substrate.

25. A process according to claim 24 wherein the printing apparatus employs a thermal ink jet process wherein the ink in the nozzles is selectively heated in an imagewise pattern, thereby causing droplets of the ink to be ejected in imagewise pattern.

26. A process according to claim 24 wherein the printing apparatus employs a piezoelectric ink jet process wherein droplets of the ink are caused to be ejected in imagewise pattern by oscillations of piezoelectric vibrating elements.

* * * * *